(12) United States Patent
Chen

(10) Patent No.: US 6,568,542 B1
(45) Date of Patent: May 27, 2003

(54) SUSPENDING CABLE RACK FOR PATCH PANEL

(75) Inventor: Michael Chen, Keelung (TW)

(73) Assignee: Surtec Industries Inc., Keelung (TW)

( * ) Notice: Subject to any disclaimer, the term of this patent is extended or adjusted under 35 U.S.C. 154(b) by 0 days.

(21) Appl. No.: 10/066,371

(22) Filed: Feb. 5, 2002

(51) Int. Cl.[7] ............................. A47F 5/00; G02B 6/00
(52) U.S. Cl. ........................ 211/26; 361/826; 385/135; 439/540.1
(58) Field of Search ..................... 211/26; 248/68.1; 361/826; 385/134, 135; 439/540.1

(56) References Cited

U.S. PATENT DOCUMENTS

| | | | | |
|---|---|---|---|---|
| 4,900,265 A | * | 2/1990 | Gridley et al. | |
| 5,448,015 A | * | 9/1995 | Jamet et al. | |
| 5,731,546 A | * | 3/1998 | Miles et al. | 174/135 |
| D409,896 S | * | 5/1999 | Kaplan | |
| 5,918,837 A | * | 7/1999 | Vicain | 248/68.1 X |
| 6,077,113 A | * | 6/2000 | Lecomte | 439/540.1 |
| 6,170,784 B1 | * | 1/2001 | MacDonald et al. | 211/26 X |
| 6,285,565 B1 | * | 9/2001 | Aberg et al. | 361/826 |
| 6,373,721 B2 | * | 4/2002 | Lecinski et al. | 361/826 |
| 6,396,992 B1 | * | 5/2002 | Debal | 385/135 |

* cited by examiner

Primary Examiner—Robert W. Gibson, Jr.
(74) Attorney, Agent, or Firm—Birch, Stewart, Kolasch & Birch, LLP

(57) ABSTRACT

A suspending cable rack for a patch panel adopts a movable design for hanging on one side of a patch panel to organize and hold communication cables in a centralized fashion. The suspending cable rack consists of a cable support plate, a suspending arm and an anchor element. The cable support plate is pivotally engaged with one end of the suspending arm, which has its other end fastened to the anchor element, which in turn is fastened to the patch panel. The suspending arm is detachable and movable, and can conveniently fasten the cable support plate to the communication cable end of the patch panel.

9 Claims, 4 Drawing Sheets

SUSPENDING CABLE RACK FOR PATCH PANEL

FIELD OF THE INVENTION

The invention relates to a suspending cable rack for patch panels, and particularly a suspending cable rack that is capable of mounting to the communication cable end of a patch panel for sorting and holding communication cables in an organized manner.

BACKGROUND OF THE INVENTION

In this age of information, gathering, processing and transmitting digitized information has become an essential ability for people living in the modem world. Network communication is very popular and widely adopted. As a result, most enterprises, government organizations or schools have set up network centers. In these network centers, there are usually patch panels to organize and hold numerous communication lines. A general network center usually has dozens of network terminal sockets to allocate and distribute network resources. A large number of communication cables and lines are required to meet this purpose. These numerous communication cables and lines tend to tangle with one another, making repairs and maintenance very difficult. Hence, cable racks are usually required to organize and hold the communication lines. Conventional frame type cable racks are used to organize jump lines and are mounted to the cabinet of patch panels. These frame type cable racks for jump lines have limited applications and cannot be adopted for environments other than the patch panels installed on the cabinets. Moreover, the frame type cable racks should have various dimensions to match different dimensions of the cabinets. They are also not convenient to install or remove, and usually require tools to do the installation or removing.

SUMMARY OF THE INVENTION

In view of the foregoing disadvantages, the primary object of the invention is to provide a suspending cable rack for patch panels that is simply structured, easy to fabricate, and adopts a movable design. The cable rack of the invention is located on a communication cable end of a patch panel, may be directly mounted to the patch panel regardless of cabinet types and specifications, and can be flexibly adopted without many different models or dimensions.

The suspending cable rack according to the invention includes a cable support plate with paired apertures formed thereon to thread bonding bands for holding communication cables. The cable support plate is pivotally mounted to an anchor element of a patch panel through a suspending arm. As the suspending cable rack is directly mounted to the patch panel through the suspending arm and anchor element, only the cable support plates of different dimensions are required to fit the patch panels of different specifications, while the specifications of the suspending arm and anchor element remain unchanged. Such a design may facilitate mass production and enhance package convenience. In addition, the suspending cable rack of the invention may adopt separable and detachable designs with the cable support plate, suspending arm and anchor element being packed separately before installation. As a result, package size can be greatly reduced to facilitate transportation, and reduce storage space and expand distribution channels.

The suspending cable rack of the invention utilizes movable suspending arms to pivotally hold the cable support plate, with one end of the suspending arms fastening to the anchor elements for mounting the cable support plate to one end of the patch panel. The movable suspending arm is pivotally engaged with a latch section of the cable support plate. The latch section includes an elastic hook and an anchor channel. The suspending arm has a latch lug located at one end to slip into the anchor channel of the latch section and engage with the elastic hook. By means of such a construction, two sets of suspending arms may be securely fastened to two ends of the cable support plate. In addition, the suspending arms are detachable and may be easily removed to facilitate installation and disassembly of the cable support plate.

The foregoing, as well as additional objects, features and advantages of the invention will be more readily apparent from the following detailed description, which proceeds with reference to the accompanying drawings. The drawings are only to serve for reference and illustrative purposes, and are not intended to limit the scope of the invention.

DESCRIPTION OF THE PREFERRED EMBODIMENT

Figure 1:
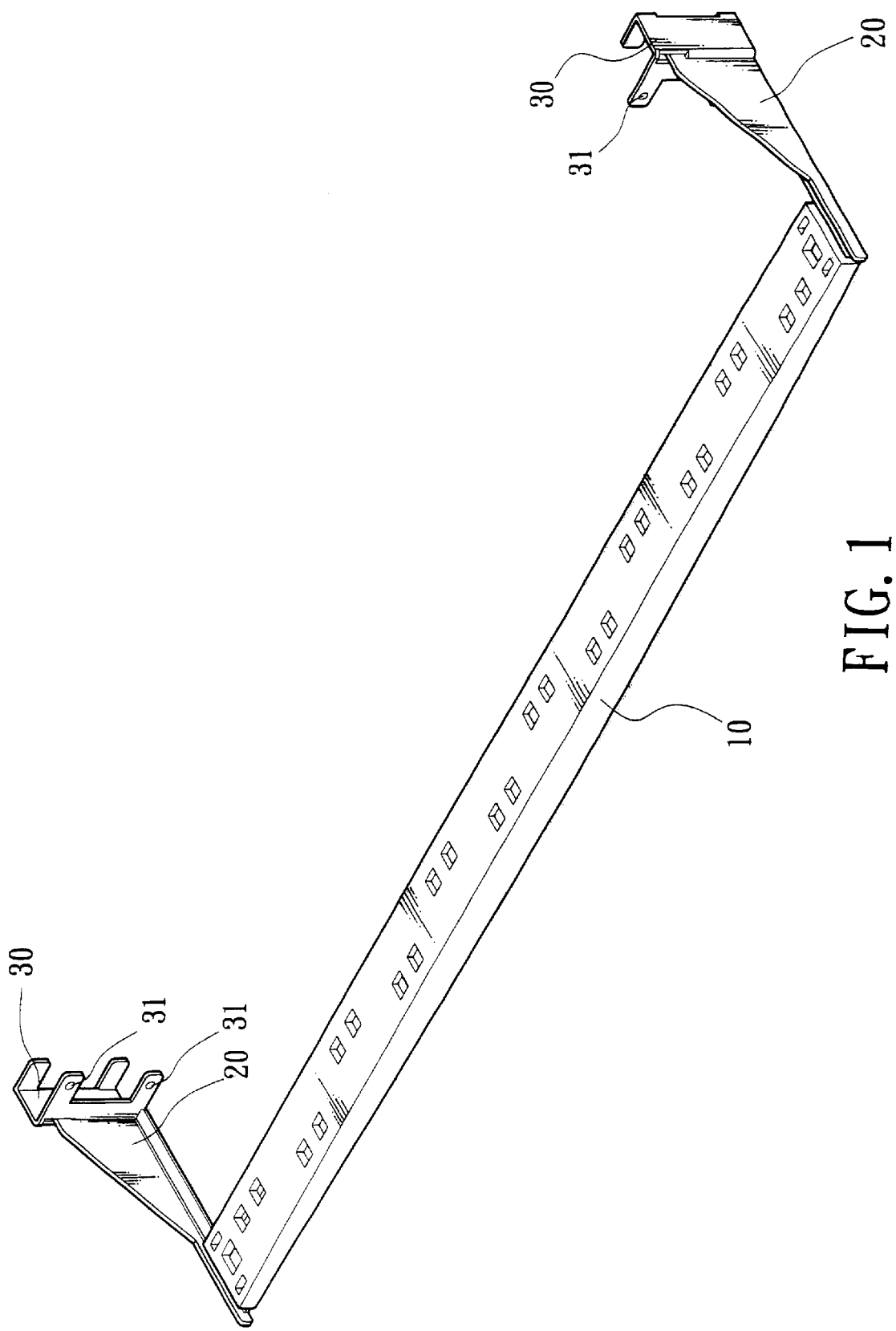
FIG. 1 is a perspective view of an embodiment of the invention.

Referring to FIG. 1 for a preferred embodiment of the invention, the suspending cable rack according to the invention consists of a cable support plate 10, a suspending arm 20 and an anchor element 30. The cable support plate 10 is a panel with a center portion thicker than two ends, with a bulging arched surface in the center according to a side view profile. The cable support plate 10 further has a plurality of paired apertures 12 to allow bonding bands to thread through for organizing and anchoring communication cables on the support plate 10. The suspending arm 20 has one end pivotally engaged with the cable support plate 10 and the other end fastened to the anchor element 30. The anchor element 30 has a fasten aperture 31 for directly mounting to a patch panel (not shown in the drawing). Thereby the cable support plate 10 may be mounted to a communication cable end of the patch panel through the suspending end 20 and anchor element 30.

Figure 2:
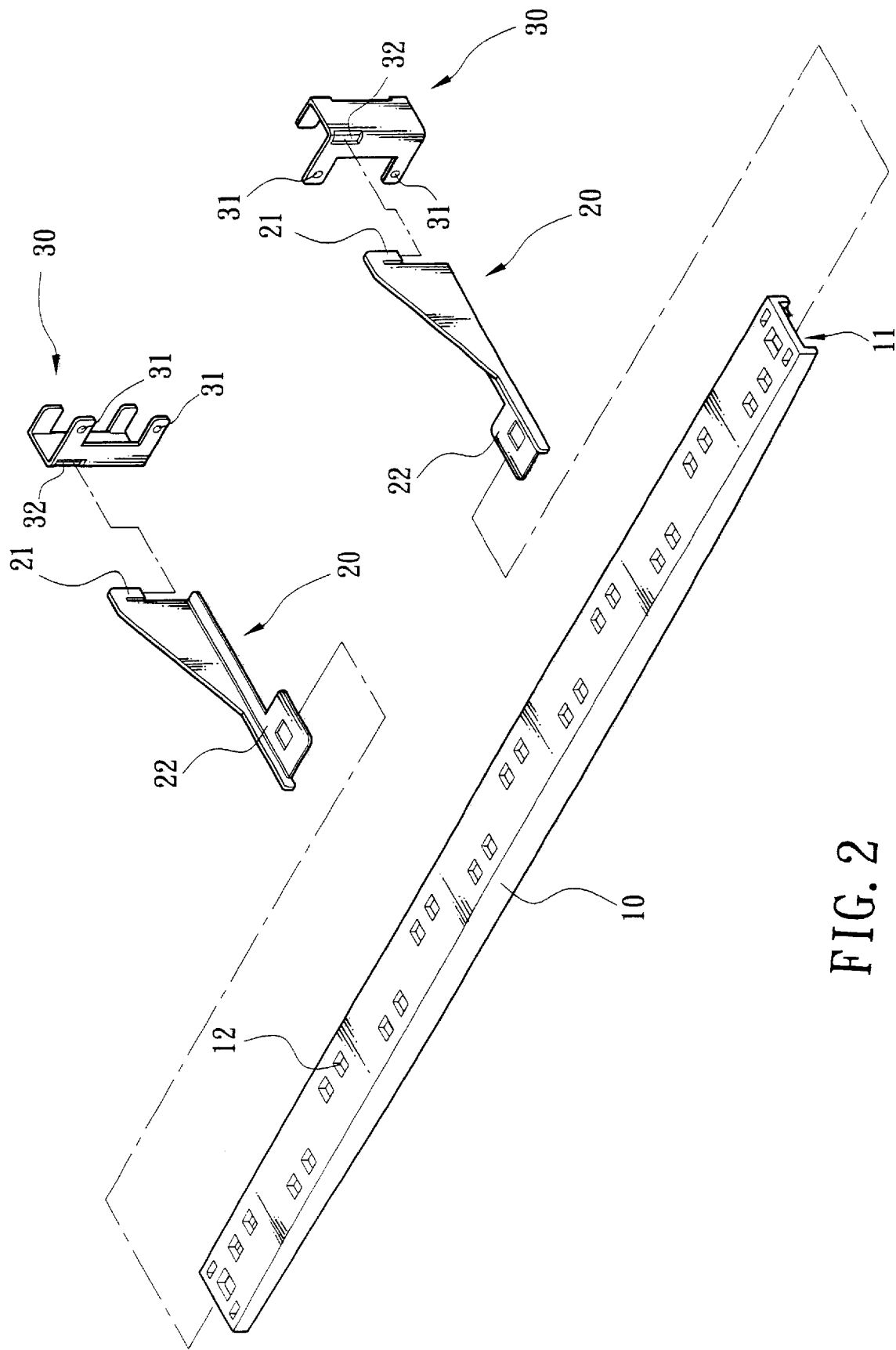
FIG. 2 is a front exploded view of an embodiment of the invention.
Figure 3:
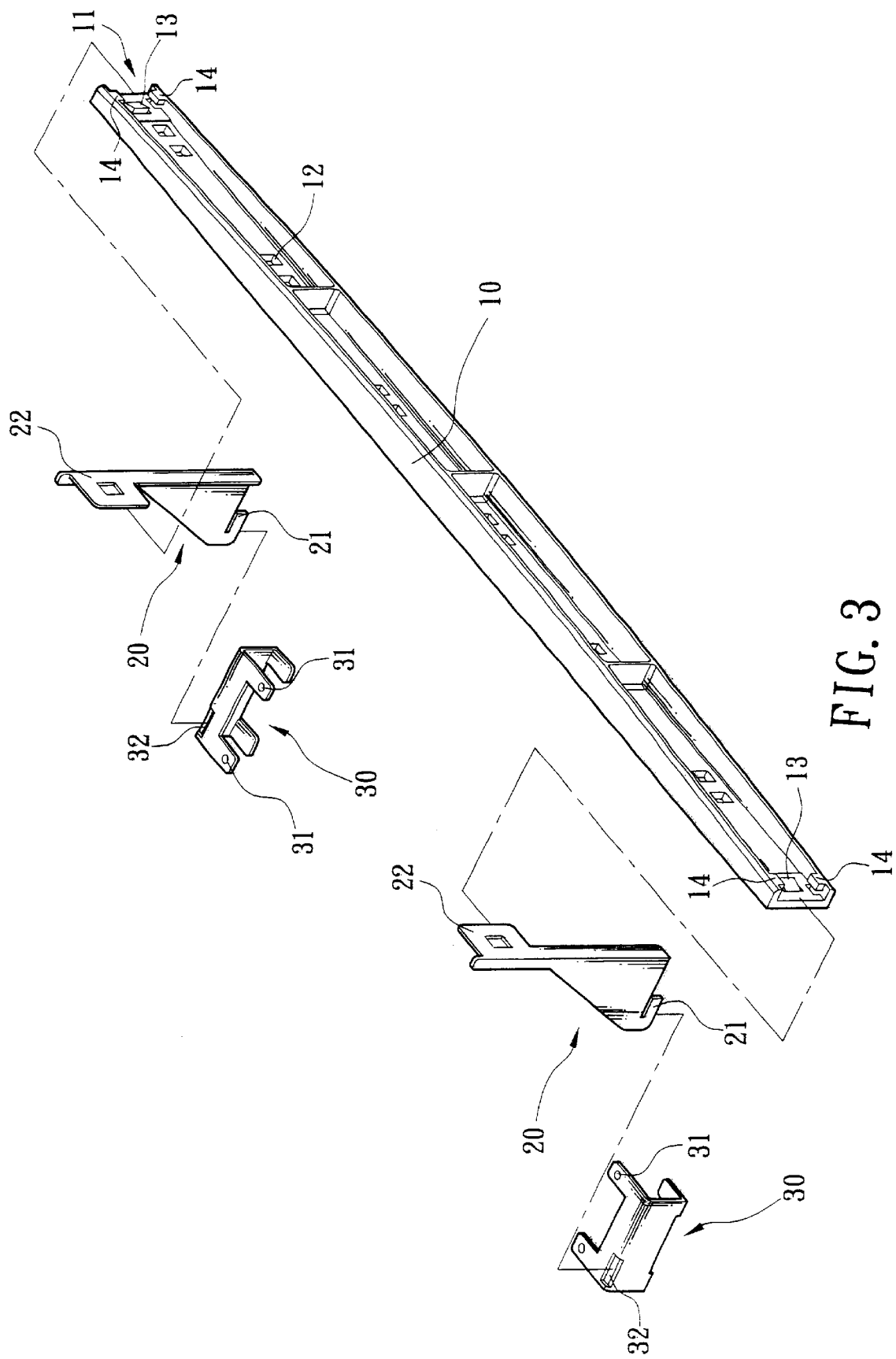
FIG. 3 is a rear exploded view of an embodiment of the invention.

Referring to FIG. 2 for more details of the structure of the invention, the cable support plate 10 has a plurality of paired apertures 12 formed thereon, and each end has a latch section 11 to pivotally engage with a latch lug 22 formed at one end of the suspending arm 20. The suspending arm 20 has another end forming a latch hook 21 for anchoring use. The anchor element 30 has a slot 32 to pivotally engage with the latch hook 21 for hanging the suspending arm 20 on the anchor element 30. Referring to FIG. 3 for illustration of the cable support plate 10 coupling with the suspending arm 20, the latch section 11 of the cable support plate 10 includes an elastic hook 13 and an anchor channel 14, which is a jutting section to form a sliding path to receive the latch lug 22 for fastening the suspending arm 20 to the cable support plate 10. The latch lug 22 of the suspending arm 20 may be slid into the anchor channel 14 of the latch section 11 to engage with the elastic hook 13. By means of such a structure, two sets of suspending arms 20 can be fastened securely to two ends of the cable support plate 10.

Figure 4:
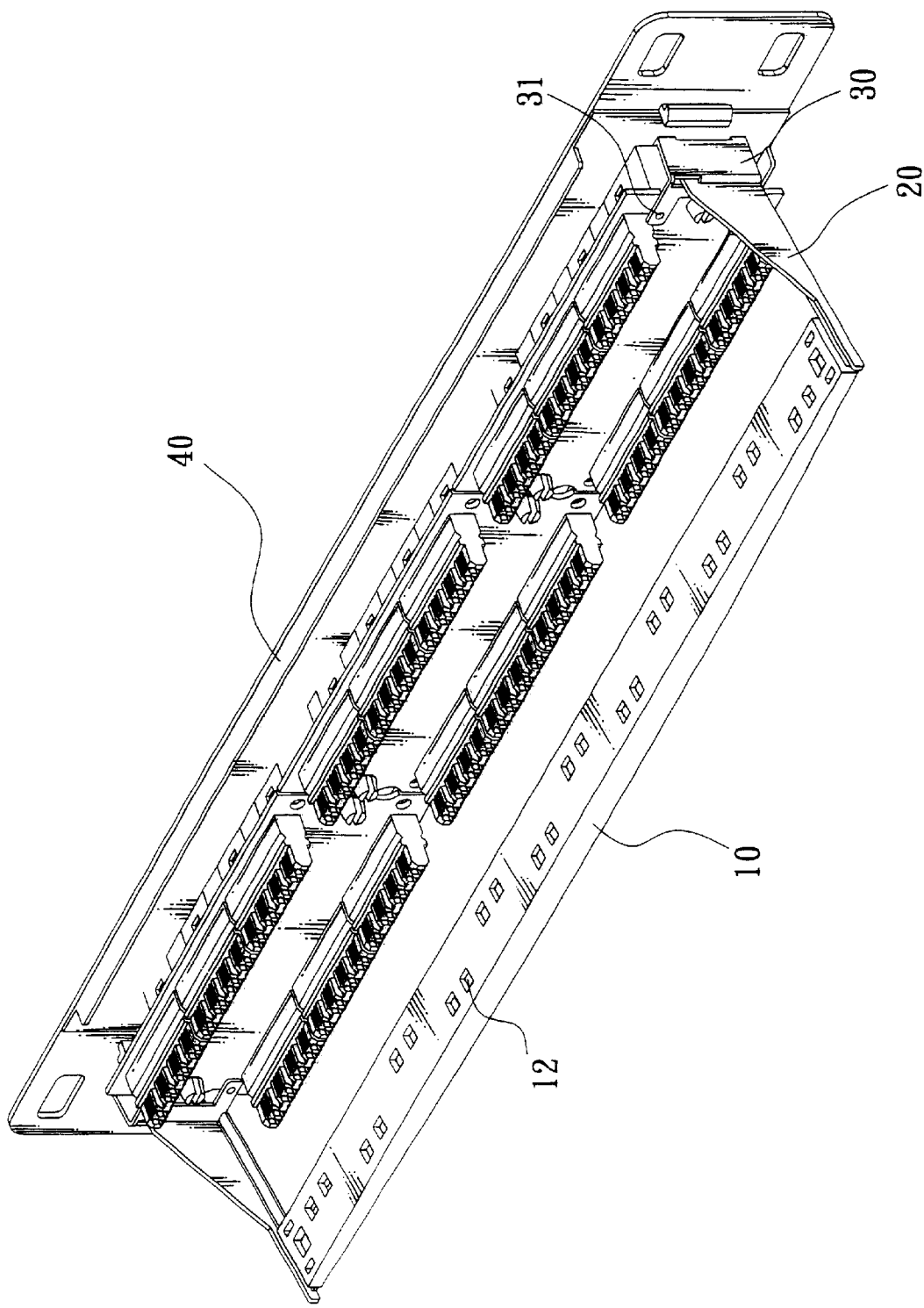
FIG. 4 is a schematic view of an embodiment of the invention mounting to a patch panel.

Referring to FIG. 4, when in use the cable support plate 10 is disposed parallel to the longitudinal axis of the patch panel. The cable support plate 10 is pivotally engaged with the suspending arm 20, which in turn is fastened to the anchor element 30. A screw is used to engage with the fasten aperture 31 for directly fastening the anchor element 30 to the patch panel 40. Hence the cable support plate 10 can be mounted to the communication cable end of the patch panel 40 through the suspending arm 20 and anchor element 30.

By means of the construction set forth above, the suspending cable rack may be directly mounted to the patch panel through the suspending arm and anchor element. The detachable suspending arm also provides a movable design to make assembly and disassembly of the suspending arm and cable support plate simple and convenient. Hence, in order to match patch panels of different types and dimensions, users need only to select a cable support plate of a desired specification, while the specifications of the suspending arm and anchor element remain unchanged. As a result, the detachable and movable design of the invention can facilitate mass production and packaging, and also is more convenient to use.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A suspending cable rack for a patch panel, comprising:
    a cable support plate located on one side of the patch panel for organizing and holding communication cables, the cable support plate having two ends, with each end having a latch section;
    a suspending arm having a first end formed with a latch lug to pivotally engage with one of the latch sections of the cable support plate and a second end formed as a latch hook; and
    an anchor element for directly fastening to the patch panel, the anchor element having a slot to pivotally engage with the latch hook for fastening the suspending arm to the anchor element.

2. The suspending cable rack for a patch panel of claim 1, wherein the patch panel has a longitudinal axis and wherein the cable support plate is parallel with the longitudinal axis of the patch panel.

3. The suspending cable rack for a patch panel of claim 1, wherein the cable support plate has a plurality of paired apertures for bonding bands to thread through for bonding the communication cables to the cable support plate.

4. The suspending cable rack for a patch panel of claim 1, wherein the cable support plate is a face panel having a center portion thicker than two ends thereof and a bulging arched surface in the center thereof.

5. The suspending cable rack for a patch panel of claim 1, wherein the two ends of the cable support plate each have a latch section for pivotally engaging with the latch lug of the suspending arm.

6. The suspending cable rack for a patch panel of claim 1, wherein the latch section includes an elastic hook and an anchor channel, the latch lug of the suspending arm being slidable into the anchor channel to couple with the latch section for engaging with the elastic hook to thereby fasten the suspending arm to each of the two ends of the cable support plate.

7. The suspending cable rack for a patch panel of claim 1, wherein the latch hook of the suspending arm is engaged with the slot of the anchor element for fastening the suspending arm to the anchor element.

8. The suspending cable rack for a patch panel of claim 1, wherein the anchor element has a fasten aperture for directly fastening the anchor element to the patch panel.

9. The suspending cable rack for a patch panel of claim 1, wherein the cable support plate is pivotally engaged with the suspending arm, the suspending arm being fastened to the anchor element, the anchor element being fastened to the patch panel, thereby to mount the cable support plate to a communication cable end of the patch panel.

\* \* \* \* \*